(12) United States Patent
Morita et al.

(10) Patent No.: US 9,340,094 B2
(45) Date of Patent: May 17, 2016

(54) CONTROL DEVICE FOR VEHICLE

(75) Inventors: Masaki Morita, Toyota (JP); Tadashi Nakagawa, Susono (JP); Hiroshi Kishita, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 13/266,215

(22) PCT Filed: Oct. 14, 2010

(86) PCT No.: PCT/JP2010/068029
§ 371 (c)(1),
(2), (4) Date: Oct. 25, 2011

(87) PCT Pub. No.: WO2011/046167
PCT Pub. Date: Apr. 21, 2011

(65) Prior Publication Data
US 2012/0198869 A1    Aug. 9, 2012

(30) Foreign Application Priority Data
Oct. 15, 2009    (JP) .................................. 2009-237967

(51) Int. Cl.
*B60H 1/00*    (2006.01)
*B60H 1/32*    (2006.01)

(52) U.S. Cl.
CPC ...... *B60H 1/3208* (2013.01); *B60H 2001/3273* (2013.01)

(58) Field of Classification Search
CPC ..................... B60H 1/3208; B60H 2001/3261; B60H 2001/3292; B60H 1/3219
USPC ................................. 62/133, 226, 228.1, 230
See application file for complete search history.

(56) References Cited

U.S. PATENT DOCUMENTS 5,441,122 A * 8/1995 Yoshida .................... 180/65.245
5,709,098 A * 1/1998 Itoh et al. ...................... 62/228.4
(Continued)

FOREIGN PATENT DOCUMENTS

AU    2003204000    * 12/2003
DE    100 49 785 A1    5/2001
(Continued)

OTHER PUBLICATIONS

International Search Report issued in International Patent Application No. PCT/JP2010/068029 dated Nov. 9, 2010.
(Continued)

*Primary Examiner* — Marc Norman
(74) *Attorney, Agent, or Firm* — Oliff PLC

(57) ABSTRACT

An engine and an electronic control unit perform cooling capacity increase control for compensating for a insufficiency of the cooling capacity of a cooling device. The electronic control unit performs a variety of control for a vehicle, including control of the cooling device. At that time, the electronic control unit calculates the target value of the cooling capacity of the cooling device, calculates the estimate value of the cooling capacity that will be able to be exerted in the future under the current control, compares the target value and the estimate value, and when it is determined from the result of the comparison that the cooling capacity will be insufficient, performs the cooling capacity increase control. The electronic control unit changes the contents of the cooling capacity increase control according to the degree of insufficiency of the estimate value with respect to the target value.

7 Claims, 3 Drawing Sheets

(56) References Cited

U.S. PATENT DOCUMENTS

| | | | |
|---|---|---|---|
| 6,178,760 B1* | 1/2001 | Tanaka et al. | 62/154 |
| 6,367,270 B2* | 4/2002 | Niimi et al. | 62/133 |
| 6,466,853 B1* | 10/2002 | Niimi et al. | 701/65 |
| 6,543,243 B2* | 4/2003 | Mohrmann et al. | 62/230 |
| 6,712,133 B1* | 3/2004 | Kyrtsos et al. | 165/239 |
| 6,796,138 B1 | 9/2004 | Imai et al. | |
| 6,830,438 B2* | 12/2004 | Iwanami et al. | 417/16 |
| 6,986,645 B2* | 1/2006 | Iwanami et al. | 417/16 |
| 7,441,414 B2* | 10/2008 | Ziehr et al. | 62/244 |
| 8,561,915 B2* | 10/2013 | Ishida et al. | 237/12.3 R |
| 2002/0043072 A1 | 4/2002 | Hamachi et al. | 62/230 |
| 2004/0168449 A1* | 9/2004 | Homan et al. | 62/134 |
| 2004/0168454 A1* | 9/2004 | Iritani | 62/230 |
| 2005/0109499 A1* | 5/2005 | Iwanami et al. | 165/202 |
| 2005/0132736 A1* | 6/2005 | Grimm et al. | 62/230 |
| 2005/0210900 A1* | 9/2005 | Oomura et al. | 62/228.1 |
| 2008/0011005 A1* | 1/2008 | Obayashi et al. | 62/243 |
| 2008/0041082 A1* | 2/2008 | Bilodeau | 62/230 |
| 2009/0126375 A1* | 5/2009 | Toyoshima et al. | 62/77 |
| 2009/0168345 A1* | 7/2009 | Martini | 361/691 |
| 2011/0067420 A1* | 3/2011 | Alston et al. | 62/133 |

FOREIGN PATENT DOCUMENTS

| | | |
|---|---|---|
| DE | 102008017329 A1 | 10/2009 |
| JP | H04-169322 A | 6/1992 |
| JP | A-2000-179374 | 6/2000 |
| JP | A-2004-066847 | 3/2004 |
| JP | A-2004-150475 | 5/2004 |
| JP | A-2005-239065 | 9/2005 |
| JP | A-2009-097772 | 5/2009 |

OTHER PUBLICATIONS

English translation of Dec. 4, 2015 Office Action issued in German Patent Application No. 11 2010 002 544.4.

* cited by examiner

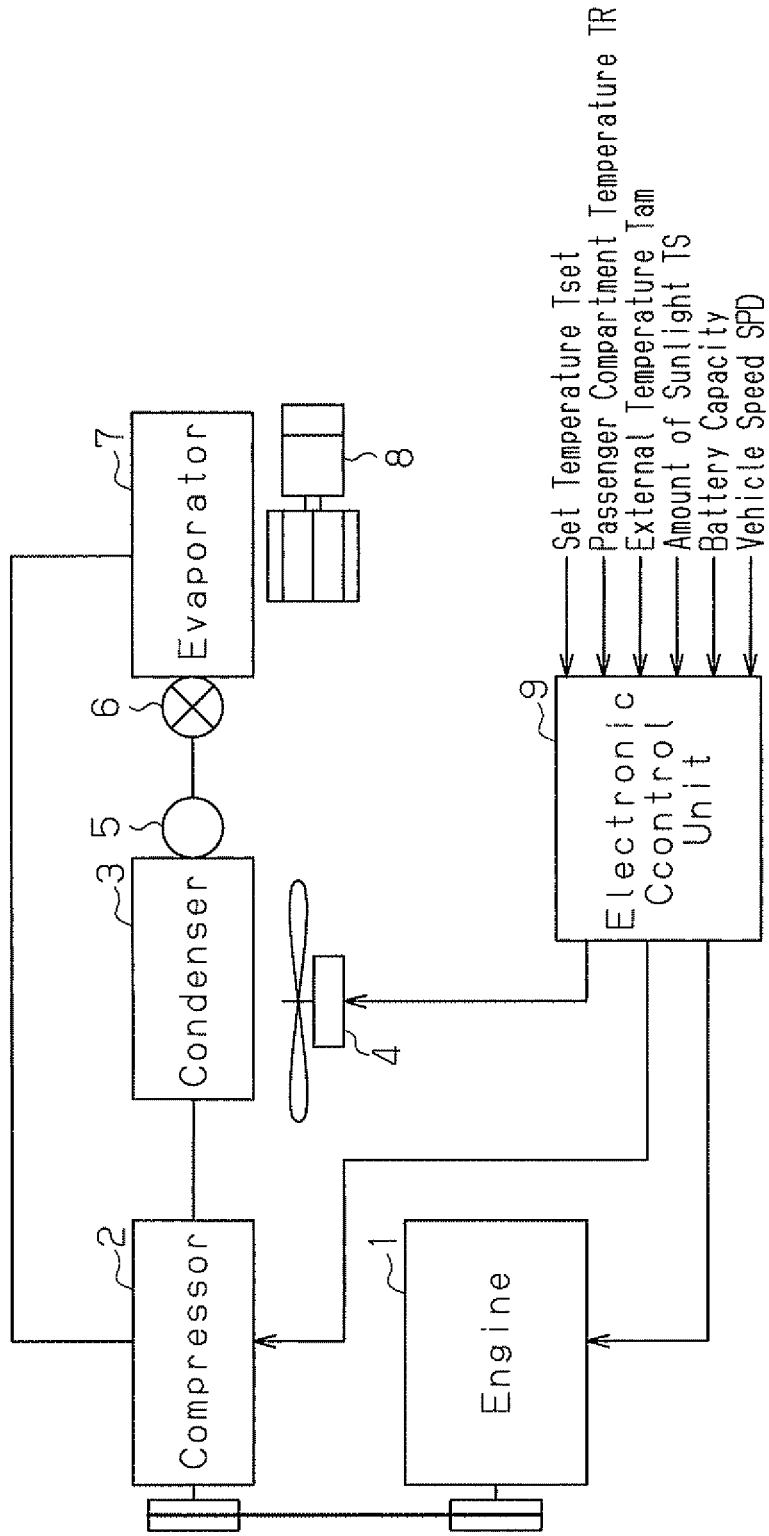

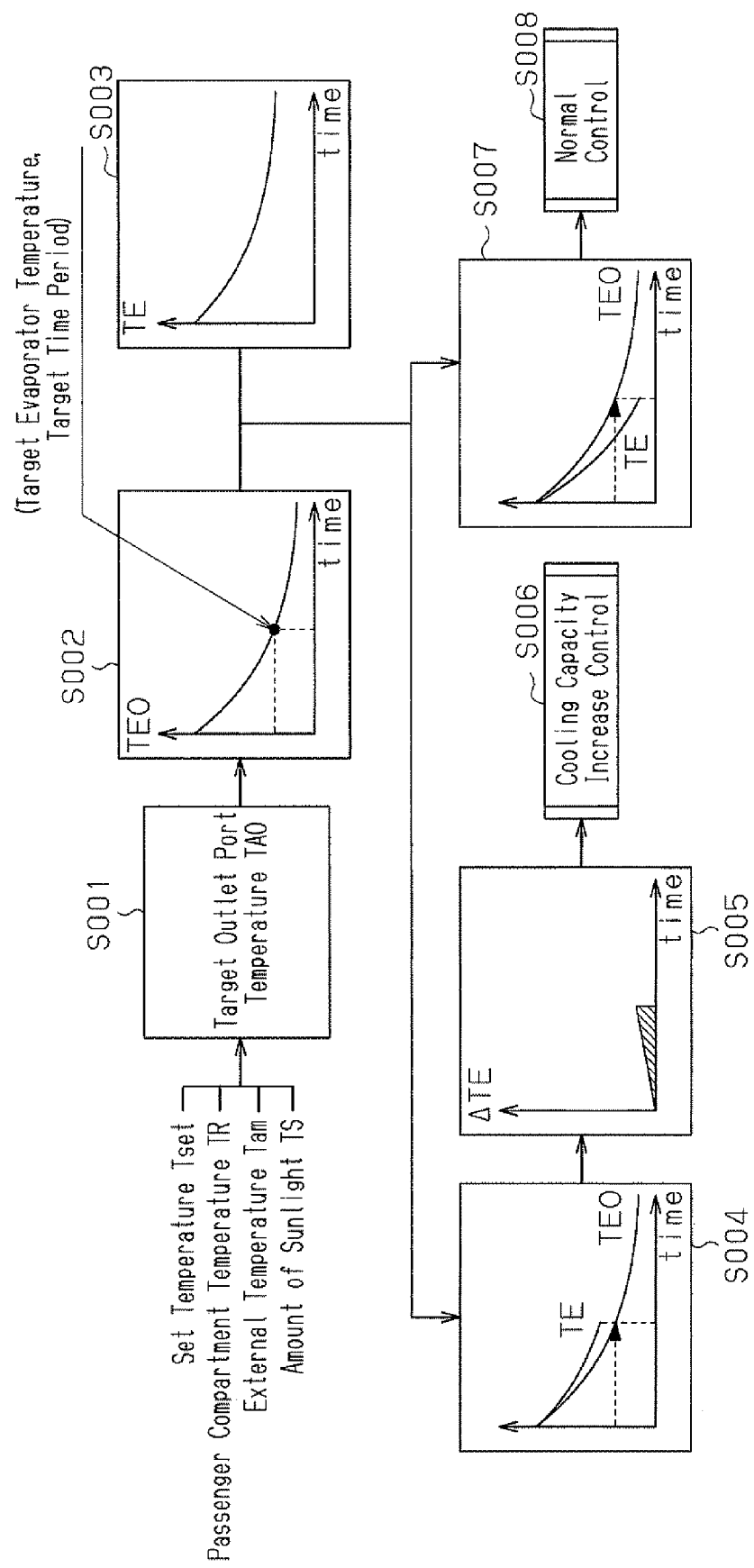

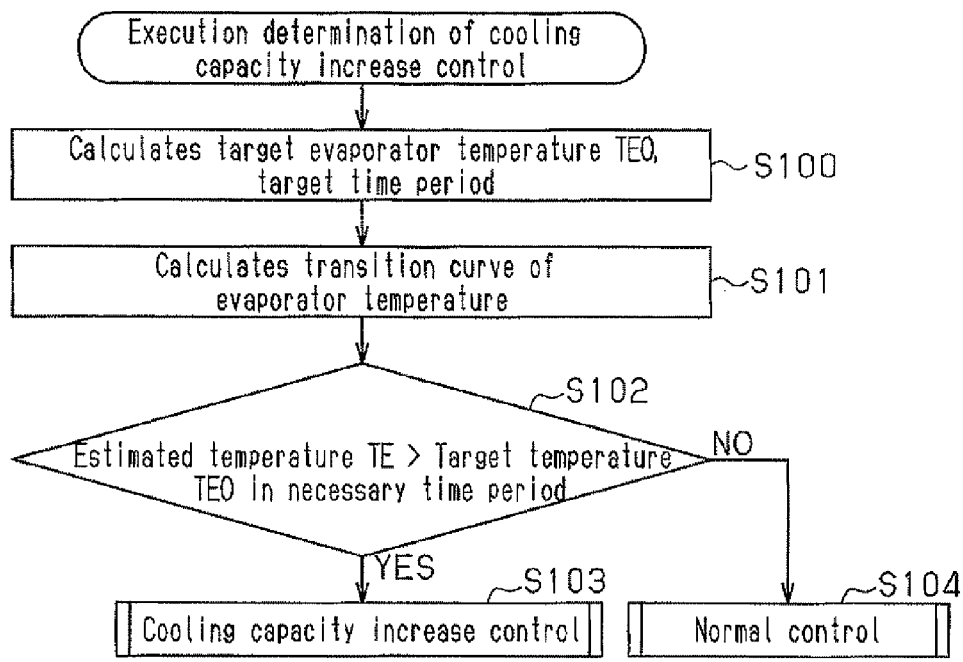
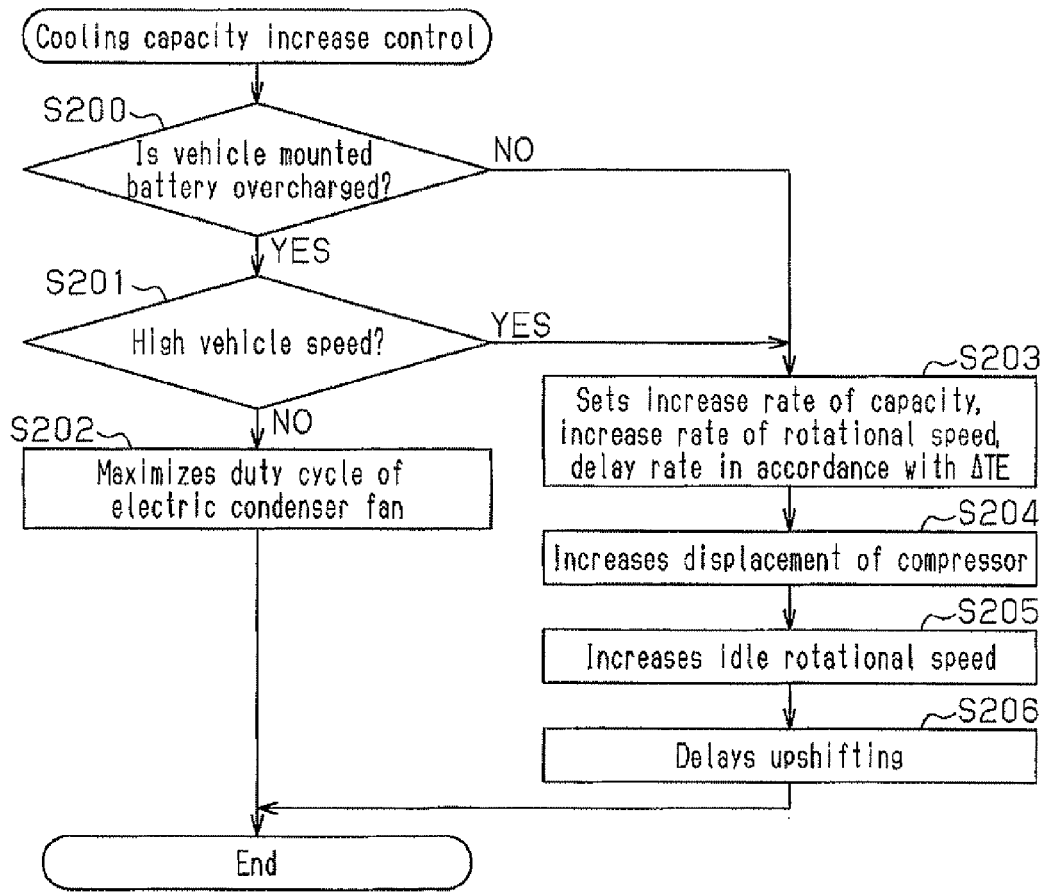

CONTROL DEVICE FOR VEHICLE

FIELD OF THE INVENTION

The present invention relates to a control device for a vehicle. More specifically, the present invention pertains to a control device for efficiently using a cooling device.

BACKGROUND OF THE INVENTION

When parked under the hot sun for a long time, the temperature in a passenger compartment of a vehicle will increase significantly. Then, even if the engine is started and a cooling device is operated, the temperature in the passenger compartment does not decrease immediately. A control device disclosed in Patent Document 1 has been proposed as a conventional technique for temporarily increasing the cooling capacity in such a circumstance.

The control device disclosed in Patent Document 1 is applied to a vehicle equipped with a continuously variable transmission. In accordance with this control device, a target rotational speed of the input shaft of the transmission is set in the following manner to increase the cooling performance. That is, in this control device, a first target rotational speed is calculated based on the degree of depression of the acceleration pedal and the vehicle speed, and a second target rotational speed is calculated based on the vehicle speed to increase the cooling capacity. Then, the higher one of the two target rotational speeds is finally set as the target rotational speed of the input shaft of the transmission. This ensures sufficient cooling performance.

PRIOR ART DOCUMENT

Patent Document

Patent Document 1: Japanese Laid-Open Patent Publication No. 2004-150475

SUMMARY OF THE INVENTION

In the conventional control device, when the cooling capacity is insufficient, the rotational speed of the input shaft of the transmission is set to be at least greater than or equal to the second target rotational speed. Thus, the cooling capacity is sufficiently ensured.

However, in this case, although the target rotational speed is set in accordance with whether the cooling capacity is insufficient, the degree of insufficiency of the cooling capacity is not considered. Thus, regardless of the degree of insufficiency of the cooling capacity, the rotational speed of the input shaft of the transmission is uniformly increased. This might excessively increase the rotational speed of the input shaft of the transmission, and lead to unnecessary deterioration of fuel efficiency.

Accordingly, it is an objective of the present invention to provide a control device for a vehicle that efficiently ensures necessary cooling capacity.

To achieve the foregoing objective and in accordance with a first aspect of the present invention, a control device for a vehicle equipped with a cooling device is provided. The cooling device includes a compressor for compressing refrigerant, a condenser for cooling the compressed refrigerant, and an evaporator for cooling by vaporizing the cooled refrigerant. The control device includes target cooling capacity calculating means, estimate cooling capacity calculating means, increase control executing means, and control contents changing means. The target cooling capacity calculating means calculates a target value of the cooling capacity of the cooling device. The estimate cooling capacity calculating means calculates an estimate value of the cooling capacity that will be able to be exerted in the future under the current control. The increase control executing means compares the target value and the estimate value. If it is determined that the cooling capacity will be insufficient based on the comparison result, the increase control executing means executes a cooling capacity increase control. The control contents changing means changes the contents of the cooling capacity increase control in accordance with the degree of insufficiency of the estimate value with respect to the target value. The target cooling capacity calculating means calculates the target value of the cooling capacity and the time period during which the cooling capacity of the target value will be necessary, and the estimate cooling capacity calculating means estimates the estimate value of the cooling capacity in the calculated time period.

In the above-mentioned control device for a vehicle, the target value of the cooling capacity of the cooling device is calculated, and the estimate value of the cooling capacity that can be exerted in the future under the current control is calculated. Then, the calculated target value and the estimate value are compared, and if it is determined that the cooling capacity will be insufficient based on the comparison result, the cooling capacity increase control is executed.

Furthermore, in the control device for a vehicle, the contents of the cooling capacity increase control are changed in accordance with the degree of insufficiency of the estimate value with respect to the target value. More specifically, the contents of the cooling capacity increase control are changed such that as the degree of insufficiency of the estimate value with respect to the target value is increased, the cooling capacity is increased by a greater amount. For example, in a case where the cooling capacity is increased by increasing the displacement of the compressor, the greater the degree of insufficiency of the estimate value with respect to the target value, the greater becomes the amount of increase of the displacement of the compressor. Also, in a case where the cooling capacity is increased by increasing the duty cycle of the condenser fan, or where the cooling capacity is increased by increasing the idle rotational speed of the engine, the greater the degree of insufficiency of the estimate value with respect to the target value, the greater the amount of increase of the duty cycle and the idle rotational speed becomes. In this manner, the required cooling capacity is ensured without insufficiency or excess, and the required cooling capacity is more efficiently ensured. Also, to ensure the comfort of the occupant, it is desirable to clearly specify what degree of cooling capacity should be ensured by what time. In this aspect, this configuration ensures necessary cooling performance by necessary time period.

In the control device for a vehicle described above, an evaporator temperature is preferably used as an index value of the cooling capacity.

In the control device for a vehicle described above, the target cooling capacity calculating means preferably calculates a target value of an air-conditioner outlet port temperature based on the condition inside and outside of a passenger compartment. Based on the calculated value, the target cooling capacity calculating means preferably calculates a target value of the evaporator temperature.

In the control device for a vehicle described above, the control contents changing means preferably changes the contents of the cooling capacity increase control in accordance with the running condition of the vehicle.

The most efficient cooling capacity increase control differs in accordance with the running condition of the vehicle. The cooling capacity increase control is executed by, for example, increasing the displacement of the compressor, increasing the idle rotational speed of the engine, and increasing the duty cycle of the condenser fan. Among these, increasing the displacement of the compressor or increasing the idle rotational speed of the engine reduces the fuel efficiency. Thus, when the vehicle mounted battery is overcharged, the cooling capacity increase control is executed by increasing the duty cycle of the condenser fan, and if such is not the case, the cooling capacity increase control is executed by another method. In this manner, the cooling capacity increase control is efficiently performed.

In the control device for a vehicle described above, the control contents changing means preferably changes the contents of the cooling capacity increase control in accordance with the running speed of the vehicle.

When the vehicle is running at a high speed, the operating rate of the engine (rotational speed, load) is high. Thus, even if the engine operating rate is increased to increase the cooling capacity, the fuel efficiency is not significantly reduced. When the vehicle is running at a low speed, the operating rate of the engine is low. Thus, when the engine operating rate is increased to increase the cooling capacity, the fuel efficiency is significantly reduced. Therefore, it is desirable that the cooling capacity increase control that involves increasing the engine operating rate be executed when the vehicle is running at a high speed, and the cooling capacity increase control that involves other means be executed when the vehicle is running at a low speed. Thus, the cooling capacity increase control is efficiently performed by changing the contents of the cooling capacity increase control in accordance with the running speed of the vehicle.

In the control device for a vehicle described above, the control contents changing means preferably changes the contents of the cooling capacity increase control in accordance with the charging level of a vehicle mounted battery.

If the cooling capacity increase control is executed by, for example, increasing the duty cycle of the electric condenser fan when the vehicle mounted battery is overcharged, the fuel efficiency is not reduced. Therefore, it is desirable that the cooling capacity increase control be executed using electric power when the battery is overcharged, and if such is not the case, it is desirable that the cooling capacity increase control be executed using sources other than electric power. Thus, the cooling capacity increase control is efficiently performed by changing the contents of the cooling capacity increase control in accordance with the charge level of the vehicle mounted battery.

In the control device for a vehicle described above, when the vehicle speed is low and the vehicle mounted battery is overcharged, the control contents changing means preferably executes the cooling capacity increase control that involves increasing electric power consumption. If such is not the case, the control contents changing means preferably executes the cooling capacity increase control that involves increasing the engine operating rate.

With this configuration, the cooling capacity increase control is switched between the following two controls in accordance with the charge level of the vehicle mounted battery and the vehicle speed. A first cooling capacity increase control is a control that involves increasing the electric power consumption, such as by increasing the duty cycle of the electric condenser fan. In such a control, the vehicle mounted battery is overcharged. Therefore, it is unnecessary to newly produce electric power to increase the cooling capacity of the cooling device, and fuel efficiency is not reduced. A second cooling capacity increase control is a control that involves increasing the engine operating rate such as by increasing the displacement of the compressor, increasing the idle rotational speed of the engine, and delaying upshifting of the vehicle mounted transmission. In such a control, the fuel efficiency is inevitably reduced. However, when the vehicle is running at a high speed when the engine operating rate is increased, the fuel efficiency does not significantly deteriorate by execution of the control. Therefore, the most efficient cooling capacity increase control is selectively executed by switching the contents of the cooling capacity increase control in accordance with the charge level of the vehicle mounted battery and the vehicle speed as described above.

BRIEF DESCRIPTION OF THE DRAWINGS

FIG. 1 is a schematic view illustrating the entire configuration of a control device according to one embodiment of the present invention;

FIG. 2 is a block diagram showing the control manner for determining execution of a cooling capacity increase control;

FIG. 3 is a flowchart showing the routine of an electronic control unit for determining execution of the cooling capacity increase control; and FIG. 4 is a flowchart showing the routine of the electronic control unit for the cooling capacity increase control.

DETAILED DESCRIPTION OF THE PREFERRED EMBODIMENTS

A control device for a vehicle according to one embodiment of the present invention will now be described with reference to FIGS. 1 to 4.

As shown in FIG. 1, the cooling device for a vehicle includes a compressor 2, which is driven by power from an engine 1. The compressor 2 compresses refrigerant into a high-temperature and high-pressure semiliquid form and then discharges the refrigerant. The displacement of the compressor 2 is variable. When the displacement of the compressor 2 is increased, the cooling capacity of the cooling device is also increased.

The semiliquid refrigerant compressed by the compressor 2 is fed to a condenser 3. The refrigerant fed to the condenser 3 is cooled by air blown from an electric condenser fan 4. This further liquefies the refrigerant, and the refrigerant is fed to a receiver tank 5.

In the receiver tank 5, a small amount of refrigerant that did not liquefy is separated from liquefied refrigerant. Also, moisture and impurities in the refrigerant are removed by a desiccant and a strainer. The liquefied refrigerant separated in the receiver tank 5 is sprayed into an evaporator 7 through a tiny nozzle hole in an expansion valve 6. In this manner, the liquefied refrigerant is vaporized at once.

The vaporized refrigerant extracts heat around the evaporator 7. Air is sent to the cooled evaporator 7 by a blower fan 8 so that cool air is obtained. The cool air is sent to the passenger compartment to cool the passenger compartment. The refrigerant that is discharged from the evaporator 7 is returned to the compressor 2 again. A cycle of the cooling device is configured by circulating the refrigerant.

The vehicle equipped with the cooling device includes an electronic control unit 9, which controls the engine 1, the cooling device, and the transmission. The electronic control unit 9 includes a central processing unit (CPU), a read only memory (ROM), a random access memory (RAM), and an input/output port (I/O). The CPU executes computation processes associated with various types of controls of the vehicle. The ROM stores various types of programs and data for control. The RAM temporarily stores the computation results of the CPU and the detection results of the sensor. The I/O inputs and outputs signals between the electronic control unit 9 and an external device.

The electronic control unit 9 receives detection signals of various types of sensors, which detect, for example, the running condition of the vehicle, through the I/O. The signals input to the electronic control unit 9 include a set temperature Tset of the cooling device, a passenger compartment temperature TR, an external temperature Tam, an amount of sunlight TS, a battery capacity, and a vehicle speed SPD.

In the present embodiment, a cooling capacity increase control for increasing the cooling capacity of the cooling device is executed as needed after the vehicle is started. Whether the cooling capacity increase control needs to be executed is determined by comparing a target value of the cooling capacity of the cooling device with an estimate value. The estimate value of the cooling capacity represents an estimated cooling capacity that will be able to be exerted in the future under the current control in which the cooling capacity increase control is not being executed. When the estimate value of the cooling capacity becomes less than the target value, it is estimated that the cooling capacity will be insufficient. At this time, the cooling capacity increase control is executed.

In this embodiment, the temperature of the evaporator of the cooling device is used as an index value of the cooling capacity. The evaporator temperature is a surface temperature of the evaporator 7. The lower the evaporator temperature, the higher the cooling capacity of the cooling device becomes.

Whether the cooling capacity increase control needs to be executed is determined in a manner shown in FIG. 2. As shown in FIG. 2, first, a target outlet port temperature TAO is calculated based on the set temperature Tset, the passenger compartment temperature TR, the external temperature Tam, and the amount of sunlight TS (S001). The target outlet port temperature TAO is a target value of the blowing air temperature. That is, the target outlet port temperature TAO refers to the blowing air temperature from the air-conditioner outlet port that is necessary to achieve the desired cooling performance under the current condition.

Then, the target evaporator temperature TEO and the target time period are calculated based on the target outlet port temperature TAO (S002). The target evaporator temperature TEO refers to a temperature of the refrigerant in the evaporator 7 that is necessary for obtaining the target outlet port temperature TAO. The target time period refers to the time from when the vehicle is started until the passenger compartment is cooled.

Subsequently, a transition curve of the estimate evaporator temperature TE is computed based on the current running condition of the vehicle (S003). The transition curve of the estimate evaporator temperature TE shows how the evaporator temperature changes under the current control in which the cooling capacity increase control is not executed. The transition curve is calculated based on the engine rotational speed NE and the external temperature Tam.

Thereafter, the estimate evaporator temperature TE in the target time period is calculated based on the transition curve. Then, the estimate evaporator temperature TE in the target time period and the target evaporator temperature TEO are compared (S004, S007). Based on the comparison result, it is determined whether or not to execute the cooling capacity increase control. More specifically, if the estimate evaporator temperature TE exceeds the target evaporator temperature TEO (S004), it is determined that the cooling capacity will be insufficient if unchanged, and the cooling capacity increase control is executed (S006). If the estimate evaporator temperature TE is less than or equal to the target evaporator temperature TEO (S007), the cooling capacity increase control is not executed, and the normal control is performed (S008).

The cooling capacity increase control is performed in accordance with the difference $\Delta TE$ of the estimate evaporator temperature TE with respect to the target evaporator temperature TEO, that is, the degree of insufficiency of the estimate value with respect to the target value of the cooling capacity (S005). Conceptually, the cooling capacity increase control is executed in the hatched area as shown in the graph of step S005 that shows the transition of the difference $\Delta TE$. More specifically, as the degree of insufficiency increases, the contents of the cooling capacity increase control is changed to increase the cooling capacity by a greater amount.

The process for determining whether to execute the cooling capacity increase control shown in FIG. 3 is periodically executed by the electronic control unit 9 after the vehicle is started. When the process shown in FIG. 3 is started, the electronic control unit 9 first calculates the target evaporator temperature TEO and the target time period in step S100. Subsequently, the electronic control unit 9 calculates the transition curve of the estimate evaporator temperature, and calculates the estimate evaporator temperature TE in the target time period in step S101.

Then, the electronic control unit 9 compares the target evaporator temperature TEO in the target time period and the estimate evaporator temperature TE in step S102. At this time, if the estimate evaporator temperature TE exceeds the target evaporator temperature TEO (S102:YES), the electronic control unit 9 executes the cooling capacity increase control (S103), and if the estimate evaporator temperature TE does not exceed the target evaporator temperature TEO (S102: NO), the electronic control unit 9 executes the normal control (S104).

If it is determined to execute the cooling capacity increase control as the result of the above process, the process for the cooling capacity increase control shown in FIG. 4 is executed. In the present embodiment, the contents of the cooling capacity increase control are changed such that the greater the difference $\Delta TE$ of the estimate evaporator temperature TE with respect to the target evaporator temperature TEO, the greater the degree of increase of the cooling capacity becomes.

Furthermore, in the present embodiment, the contents of the cooling capacity increase control are changed in accordance with the running condition of the vehicle to increase the cooling capacity more efficiently. More specifically, two controls are properly used in accordance with the running condition of the vehicle. The controls include the cooling capacity increase control that involves increasing the duty cycle of the electric condenser fan 4, and the cooling capacity increase control that involves increasing the displacement of the compressor 2, increasing the idle rotational speed of the engine 1, and delaying upshifting.

In the former cooling capacity increase control, electric power is consumed. However, in the case in which it is unnecessary to newly produce power required to execute the control, the cooling capacity can be increased without reducing the fuel efficiency. In the latter cooling capacity increase control, the fuel efficiency is inevitably reduced since the compressor 2 is operated more by increasing the operating rate of the engine 1. However, if the vehicle speed is high, the fuel efficiency does not deteriorate due to execution of the above-mentioned control since the operating rate of the engine 1 is high. In the latter control, the cooling capacity is increased by a greater amount compared to the former control.

Thus, if the vehicle speed is low and the vehicle mounted battery is overcharged, and if the duty cycle of the electric condenser fan 4 can be increased without increasing the electric power generation of the alternator, the former cooling capacity increase control is executed. If the vehicle mounted battery is not overcharged, or when the vehicle speed is high, the latter cooling capacity increase control is executed.

As shown in FIG. 4, if the cooling capacity increase control is started, the electronic control unit 9 first checks whether the vehicle mounted battery is overcharged in step S200. If the vehicle mounted battery is overcharged (S200: YES), the electronic control unit 9 checks whether the vehicle speed is high in step S201. If the vehicle speed is not high (S201: NO), the electronic control unit 9 proceeds to step S202. Then, the electronic control unit 9 sets the duty cycle of the electric condenser fan 4 to the maximum in step S202, and terminates the process of this routine.

If the vehicle mounted battery is not overcharged (S200: NO), or if the vehicle is running at a high speed (S201: YES), the electronic control unit 9 proceeds to step S203. Then, the electronic control unit 9 sets the increase rate of the compressor displacement, the increase rate of the idle rotational speed, and the delay rate of upshifting in accordance with the difference $\Delta TE$ of the estimate evaporator temperature TE with respect to the target evaporator temperature TEO in step S203. In this case, as the difference $\Delta TE$ is increased, and as the degree of insufficiency in the cooling capacity is increased, the increase rates and the delay rate are each set to a greater value.

In accordance with the set increase rate and delay rate, the electronic control unit 9 increases the displacement of the compressor 2 (step S204), increases the idle rotational speed (step S205), and delays upshifting (step S206). Thereafter, the electronic control unit 9 terminates the process of this routine.

The process of step S100 in FIG. 3 corresponds to the process executed by target cooling capacity calculating means, and the process of step S101 in FIG. 3 corresponds to the process executed by estimate cooling capacity calculating means. Also, the process of step S102 in FIG. 3 corresponds to the process executed by increase control executing means, and the process of step S203 in FIG. 4 corresponds to the process executed by control contents changing means. Further, the electronic control unit 9 executing the above processes corresponds to the target cooling capacity calculating means, the estimate cooling capacity calculating means, the increase control executing means, and the control contents changing means.

The above-mentioned control device for a vehicle has the following advantages.

(1) The target value of the cooling capacity (target evaporator temperature TEO) is calculated, and the estimate value of the cooling capacity (estimate evaporator temperature TE) is calculated. Then, the calculated target value (TEO) and the estimate value (TE) are compared. If it is determined that the cooling capacity is insufficient based on the comparison result, the cooling capacity increase control is executed. Furthermore, the contents of the cooling capacity increase control are changed in accordance with the degree of insufficiency of the estimate value with respect to the target value. More specifically, the contents of the cooling capacity increase control are changed such that as the degree of insufficiency of the estimate value with respect to the target value is increased, the cooling capacity is increased by a greater amount. In this manner, since the degree of insufficiency of the cooling capacity is checked, and the contents of the cooling capacity increase control are changed in accordance with the degree of insufficiency, the necessary cooling capacity is efficiently ensured without insufficiency or excess.

(2) The electronic control unit 9 calculates the target value of the cooling capacity and the time period in which the cooling capacity of the target value will be required and estimates the estimate value of the cooling capacity in that time period. Accordingly, the necessary cooling performance is ensured in the necessary time period, and comfort of the occupants is ensured.

(3) The evaporator temperature is used as the index value of the cooling capacity. Also, the target value of the air-conditioner outlet port temperature is calculated based on the conditions inside and outside of the passenger compartment. Further, the target value of the evaporator temperature (target evaporator temperature TEO) is calculated based on the above calculated value. Accordingly, the target value and the estimate value of the cooling capacity are precisely obtained.

(4) The contents of the cooling capacity increase control are changed in accordance with the running condition of the vehicle (the running speed of the vehicle, the degree of electric charge of the vehicle mounted battery). Accordingly, the cooling capacity increase control is efficiently performed in the optimum manner in accordance with the running condition of the vehicle.

(5) If the vehicle speed is low, and the vehicle mounted battery is overcharged, the cooling capacity increase control that involves increasing the electric power consumption is executed. If such is not the case, the cooling capacity increase control that involves increasing the operating rate of the engine is executed. More specifically, if the vehicle speed is low, and the vehicle mounted battery is overcharged, the cooling capacity increase control that increases the duty cycle of the electric condenser fan 4 is executed. If such is not the case, the cooling capacity increase control is executed that increases the displacement of the compressor 2, increases the idle rotational speed of the engine 1, and delays upshifting. In the former cooling capacity increase control, even though electric power is consumed, the cooling capacity is increased without reducing the fuel efficiency if it is not necessary to newly produce the electric power needed for execution of the control. In the latter cooling capacity increase control, the fuel efficiency is inevitably deteriorated since the compressor 2 is operated more by increasing the operating rate of the engine 1. However, if the vehicle speed is high, the fuel efficiency does not deteriorate due to execution of the above-mentioned control since the operating rate of the engine 1 is high. In the latter control, the cooling capacity is increased by a greater amount as compared to the former control. In this manner, the most efficient cooling capacity increase control is selectively executed in accordance with the running condition of the vehicle.

The above embodiment may be modified as follows.

The duty cycle of the electric condenser fan 4 is always set to the maximum if the vehicle speed is low, and the vehicle mounted battery is overcharged. However, to perform the cooling capacity increase control more efficiently, the duty cycle may be controlled in accordance with the difference $\Delta TE$ such that the greater the difference $\Delta TE$ of the estimate evaporator temperature TE with respect to the target evaporator temperature TEO, the greater the duty cycle of the electric condenser fan 4 becomes.

The contents of the cooling capacity increase control are switched based on the charge level of the vehicle mounted battery and the vehicle speed. However, the contents of the control may be switched based on only the charging level of the vehicle mounted battery or the vehicle speed. Also, the contents of the control may be switched based on the engine rotational speed, the engine load, the external temperature, or the amount of sunlight. More specifically, in order to efficiently increase the cooling capacity, the cooling capacity increase control that involves increasing the engine operating rate may be executed if the engine rotational speed or the engine load is high. If such is not the case, the cooling capacity increase control that involves consuming electric power may be executed. Also, if it is necessary to increase the cooling capacity due to reasons such as a high external temperature, or a great amount of sunlight, the cooling capacity increase control may be selectively executed to significantly increase the cooling capacity. If such is not the case, the cooling capacity increase control may be selectively executed to inhibit deterioration of the fuel efficiency while slightly increasing the cooling capacity.

If the vehicle mounted battery is not overcharged, or when the vehicle speed is high, the cooling capacity increase control is executed by increasing the displacement of the compressor 2, increasing the idle rotational speed of the engine 1, and delaying upshifting. However, if the cooling capacity can be increased, only one or two of the three controls may be executed.

The contents of the cooling capacity increase control are switched in accordance with the charging level of the vehicle mounted battery or the vehicle speed, but the control contents do not need to be switched in accordance with the running condition of the vehicle. That is, as long as the necessary cooling capacity is efficiently ensured without insufficiency or excess, the contents of the cooling capacity increase control may only be changed in accordance with the degree of insufficiency of the estimate value with respect to the target value of the cooling capacity.

The target evaporator temperature TEO and the target time period are calculated based on the target outlet port temperature TAO. However, the target value (target time period) of the time period from when the vehicle is started until the passenger compartment is cooled may be a fixed value. In this case, since the target time period is a constant, the process for calculating the target value is omitted.

The target value of the air-conditioner outlet port temperature is calculated based on the condition inside and outside of the passenger compartment (the set temperature Tset, the passenger compartment temperature TR, the external temperature Tam, and the amount of sunlight TS). Based on the calculated value, the target value of the evaporator temperature (the target evaporator temperature TEO) is calculated. However, the target evaporator temperature TEO may be directly obtained based on the condition inside and outside of the passenger compartment without calculating the target value of the air-conditioner outlet port temperature. Also, the target evaporator temperature TEO may be calculated using parameters other than the set temperature Tset, the passenger compartment temperature TR, the external temperature Tam, and the amount of sunlight TS.

The evaporator temperature is used as the index value of the cooling capacity of the cooling device. However, for example, the air-conditioner outlet port temperature may be used as the index value of the cooling capacity.

First, the transition curve of the estimate evaporator temperature TE is calculated, and the estimate evaporator temperature TE in the target time period is calculated based on the transition curve. However, the estimate evaporator temperature TE in the target time period may be specifically calculated without calculating the transition curve. In this case also, the cooling capacity increase control can be efficiently performed.

The invention claimed is:

1. A control device of a vehicle comprising a cooling device, the cooling device including a compressor for compressing refrigerant, a condenser for cooling the compressed refrigerant, an evaporator for cooling by vaporizing the cooled refrigerant, and an air-conditioner outlet port, the control device comprising a processor configured to:
   (i) calculate a target air-conditioner outlet port temperature (TAO) that is necessary to achieve a set or desired temperature within a predetermined time period under current conditions inside and/or outside of a passenger compartment of the vehicle;
   (ii) compute, based on the TAO, a first transition curve over the predetermined time period, the first transition curve being computed so that a temperature of the evaporator transitions to a target evaporator temperature that is necessary for obtaining the TAO;
   (iii) compute, based on the current conditions, a second transition curve showing an estimated transition of the of the temperature of the evaporator over the predetermined time period under the current conditions;
   (iv) compare the first transition curve showing the transition to the target evaporator temperature over the predetermined time period with the second transition curve showing the estimate evaporator temperature transition over the predetermined time period; and
   (v) if it is determined that the first transition curve becomes less than the second transition curve over the predetermined time period, execute a cooling capacity increase control.

2. The control device for a vehicle according to claim 1, wherein the cooling capacity increase control is executed in accordance with a running condition of the vehicle.

3. The control device for a vehicle according to claim 2, wherein the running condition of the vehicle is a running speed of the vehicle.

4. The control device for a vehicle according to claim 2, wherein the running condition of the vehicle is a charging level of a vehicle mounted battery of the vehicle.

5. The control device for a vehicle according to claim 2, wherein
   when a vehicle speed of the vehicle is below a predetermined threshold and a vehicle mounted battery of the vehicle is overcharged, the processor executes a cooling capacity increase control that increases an electric power consumption, and
   when the vehicle mounted battery is not overcharged or the vehicle speed is above a predefined speed, the processor executes a cooling capacity increase control that increases an engine operating rate.

6. The control device for a vehicle according to claim 2, wherein the running condition of the vehicle is one of: (A) a current running condition of the vehicle's engine or battery, or (B) a running speed of the vehicle.

7. The control device for a vehicle according to claim 1, wherein if it is determined that the first transition curve becomes less than the second transition curve, execute the cooling capacity increase control such that the greater the degree of insufficiency of the first transition curve with respect to the second transition curve, the greater the increase of the cooling capacity increase control.

* * * * *